United States Patent [19]

Jameson

[11] 3,880,003

[45] Apr. 29, 1975

[54] FLUID FLOWMETER

[75] Inventor: Douglas L. Jameson, Duncan, Okla.

[73] Assignee: Halliburton Company, Duncan, Okla.

[22] Filed: Nov. 21, 1973

[21] Appl. No.: 417,896

[52] U.S. Cl. ............................................. 73/231 R
[51] Int. Cl. ................................................ G01f 1/10
[58] Field of Search ................................... 73/231 R

[56] References Cited
UNITED STATES PATENTS

| | | | |
|---|---|---|---|
| 3,075,383 | 1/1963 | Favill et al. | 73/231 |
| 3,355,947 | 12/1967 | Karby et al. | 73/231 |
| 3,364,743 | 1/1968 | Clinton | 73/231 |
| 3,610,039 | 10/1971 | Althouse et al. | 73/231 |
| 3,623,835 | 11/1971 | Boyd | 73/231 |

Primary Examiner—Herbert Goldstein
Attorney, Agent, or Firm—Floyd A. Gonzalez; John M. Fish, Jr.; John H. Tregoning

[57] ABSTRACT

A magnetic fluid flowmeter of the turbine type having two bearing supports each holding a bearing, a shaft between the bearings, and a low inertia rotor mounted on the shaft, wherein the upstream support employs a turbulence inducing flat downstream face lying in a plane perpendicular to the direction of fluid flow. The supports, bearings, shaft and rotor are mounted in a turbine cartridge which may be assembled and calibrated at a location remote from a suitable meter body, and then placed in the meter body as desired.

7 Claims, 4 Drawing Figures

FLUID FLOWMETER

BACKGROUND OF THE INVENTION

1. Field of the Invention

This invention relates generally to flow measuring apparatus, and more particularly, but not by way of limitation, to turbine flowmeters for measuring fluid flow through a conduit.

2. Description of the Prior Art

In a turbine flowmeter of the type used to measure the flow of fluids which has solids suspended therein and which flows through a pipeline or the like, the accuracy of the flowmeter over its entire range is dependent on the consistency of the number of output pulses for a given unit volume. This pulse to volume relationship is known as the meter factor.

If the meter factor does not vary over a given tolerance from low to high fluid flow rates, the meter will accurately measure both low and high flow rates. The meter factor is greatly dependent on the condition of the fluid as it flows across the turbine. If the fluid is in laminar flow, the velocity of the fluid will be at its maximum at the pipe axis and decrease sharply to zero at the wall. This difference in velocity will cause the meter factor to be non-linear and hence cause inaccuracies in the flow measurement.

If the fluid is in turbulent flow, there is an irregular random motion of fluid particles in directions transverse to the direction of the main flow. Thus, the velocity distribution in turbulent flow is more uniform across the pipe diameter. However, even in turbulent flow there is always a boundary layer or laminar sub-layer of fluid which is moving in laminar flow. As more turbulence is induced into the flow, this laminar sub-layer will become less significant, and the velocity distribution will become more uniform.

In previous meters the struts have been carefully designed to present a minimal frontal area to the fluid flow and are streamlined in cross section to minimize drag and turbulence in the fluid flow.

In Groner et al, U.S. Pat. No. 3,164,020, the vane structures are designed to serve generally as straightening vanes to the turbulent flow. In Boyd, U.S. Pat. No. 3,534,602 the vane structures are long and have a minimal width as in the conventional meter and are characterized as "turbulence-controlling" vane structures. As in the conventional meter, the primary purpose of these vanes is to act as flow straighteners. Any turbulence produced by these vanes would be the result of the large wetted surface they present to the fluid.

The present invention incorporates an upstream strut which has a turbulence inducing design to take advantage of the previously unrecognized benefits of introducing a more uniform velocity distribution in the meter just upstream from the rotor.

In previous turbine flowmeters high-inertia turbines with a plurality of blades have been used. Such high-inertia turbines do not quickly respond to changes in flow, require larger bearings, and result in a larger pressure drop through the meter. The present invention has a light-weight rotor with a simple, stamped two-bladed rotor which presents a minimum obstruction to the fluid flow. The resulting meter is quick to respond to changes in the flow, and has a minimum pressure drop through the meter.

Examination of prior meters will reveal complex structures with many parts, all of which require special design consideration. The present invention eliminates these complex structures by incorporating a simple design which can be inexpensively fabricated, but which results in a flowmeter which is consistently accurate over a large flow range and which is very responsive to changes in the flow.

In a turbine flowmeter, the accuracy can be extended over a greater range of flow rates if the downstream face of the upstream strut is blunted so that it is generally flat and perpendicular to the flow of the fluid.

SUMMARY OF THE INVENTION

The present invention contemplates a fluid flowmeter which includes a meter body having a longitudinal passageway formed therethrough having an upstream end portion and a downstream end portion. An upstream strut is formed in the upstream end portion of the passageway and extends into the center of the passageway from the wall thereof. The upstream strut includes a generally flat downstream face lying in a plane substantially perpendicular to the longitudinal axis of the passageway. A downstream strut is formed in the downstream end portion of the passageway and extends into the center of the passageway from the wall thereof.

A shaft having a first end and a second end is journaled in the center of the passageway coaxial therewith with the first end thereof rotatably supported by the upstream strut and with the second end thereof rotatably supported by the downstream strut. Rotor means having a plurality of magnetic blades is carried by the shaft for rotating in response to the fluid flow through the passageway. Magnetic pick-up means is carried by the meter body adjacent to the magnetic blades of the rotor means for sensing the rotation of the rotor means.

An object of the present invention is to provide a fluid flowmeter which is extremely accurate over a broad range of flow rates and is highly responsive to changes in flow rate.

Another object of the invention is to provide method and apparatus for obtaining accurate readings of fluid flow over a broad range of flow rates.

A further object of the invention is to provide a fluid flowmeter which minimizes the pressure drop in fluid flowing therethrough.

A still further object of the invention is to provide a fluid flowmeter which is economical to construct, calibrate, maintain and operate.

Other objects and advantages of the present invention will be evident from the following detailed description when read in conjunction with the accompanying drawings.

DESCRIPTION OF THE PREFERRED EMBODIMENT

Figure 1:
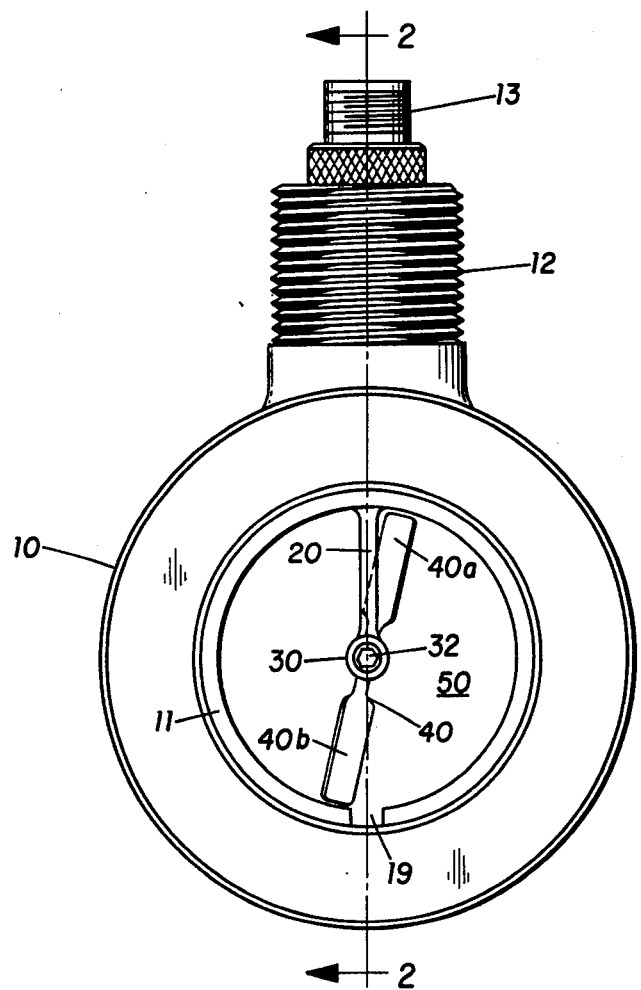
FIG. 1 is an end view of the turbine flowmeter viewed directly into the fluid conducting channel.
Figure 2:
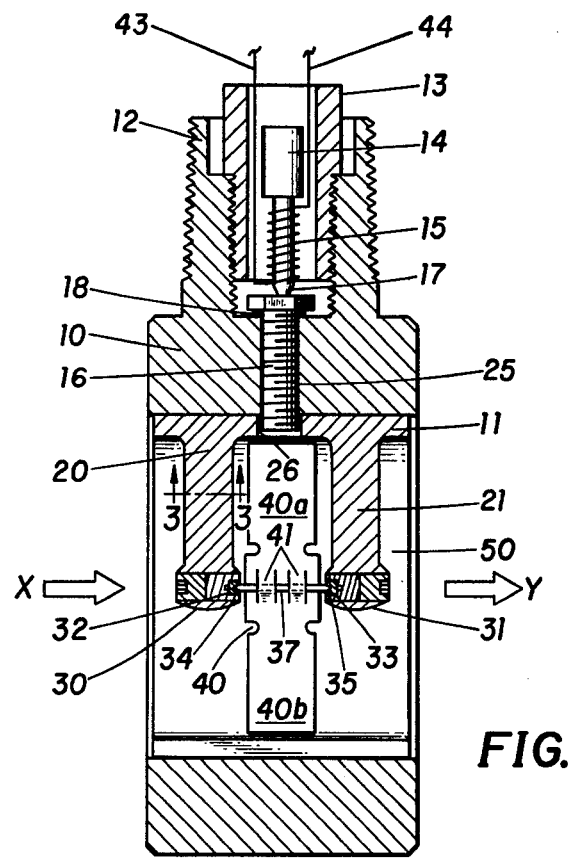
FIG. 2 is an axial cross sectional view of the flowmeter with the rotor and shaft not sectioned, viewed along section line 2—2 of FIG. 1.

Shown in FIG. 1 and FIG. 2 is an elongated, tubular meter body 10 of a non-magnetic material having an upstream extremity X and a downstream extremity Y. A tubular turbine cartridge 11 having a fluid passage 50 is fitted concentrically in the meter body 10. This cartridge has a slot 19 which extends along the full length of the turbine cartridge 11. The purpose of the slot is to allow the walls of the cartridge 11 to compress slightly as the catridge is inserted into the meter body 10. This design allows for a tight engagement between the walls of the turbine cartridge 11 and the meter body 10 without high tolerance machine work.

A cylindrical chamber 12 is provided on the meter body 10 centered around the transverse threaded hole 25. A bolt 16 of magnetic material is threaded through the hole 25 and into a transverse hole 26 in the turbine cartridge 11. The diameter of the hole 26 is slightly larger than the diameter of the hole 25 to provide clearance for the lower end of the bolt 16. The bolt 16 serves two purposes. It is part of the magnetic circuit to be discussed later, and it acts as a set screw to prevent the turbine cartridge 11 from being forced downstream or from rotating in the meter body 10 under the forces exerted by the fluid flowing through the meter. O-ring 18 provides a fluid tight seal between the bolt 16 and the meter body 10.

A magnetic pick-up element 13 is threaded into the cylindrical chamber 12. The pick-up element 13 contains a permanent magnet 14 with a pole piece 17 around which is wound a coil 15.

When the pick-up element 13 is completely threaded into the cylindrical chamber 12, the end of the pole piece 17 fits into a recess in the bolt 16 such that the pole piece comes close to but does not actually touch the bolt. It has been found that this design allows the flux to pass from the pole piece 17 into the surrounding bolt 16 while reducing noise in the event there is vibration in the meter body.

Mounted on the inner wall of the turbine cartridge 11 in line with hole 26 and opposite the slot 19 is an upstream strut 20 and a downstream strut 21. Struts 20 and 21 extend to the center of the turbine cartridge 11 where they terminate with hubs 30 and 31.

Mounted in the hubs 30 and 31 are bearings 32 and 33 having conical voids 34 and 35 formed therein. Mounted between the bearings 32 and 33 is a shaft 37 having conical ends. The conical ends of the shaft 37 are fitted into the conical voids 34 and 35.

In a turbine flowmeter the resisting torque developed by the friction in the bearings must be reduced to a small percentage of the torque developed by the fluid flowing through the turbine if the results are to be accurate. In the meter herein described this is particularly important because of the simple, two-bladed rotor used. For this reason a hard, low-friction material such as carbide is used for the bearings and shaft. Such material is also desirable because it resists wearing by the abrasives contained in the fluid.

Figure 4:
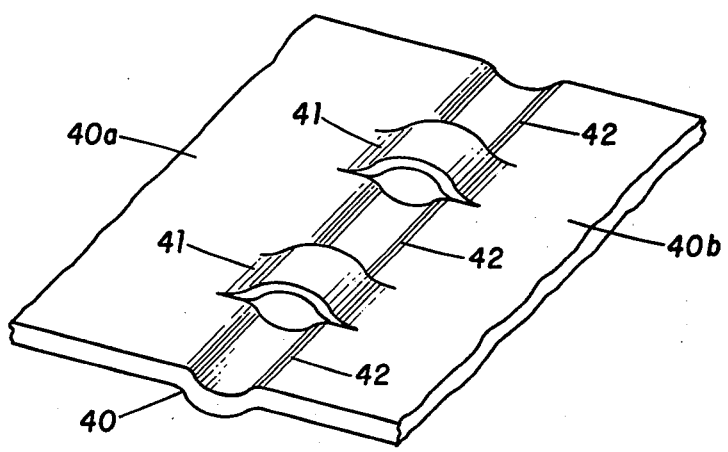
FIG. 4 is a partial perspective view of the rotor showing the means by which the rotor is mounted on the rotor shaft.

A rotor 40 having blades of magnetic material 40a and 40b is mounted on the shaft 37. As shown in FIG. 4, rotor 40 has bent up portions 41 and bent down portions 42 to form a channel in the center of the rotor through which the shaft 37 is pressed. The rotor 40 and the shaft 37 are secured by a suitable adhesive to prevent any slippage between the rotor and shaft.

The preferred rotor is stamped from a flat piece of magnetic steel. The blades have a flat pitch which determines the speed with which the rotor turns. The preferred pitch is 25°.

The rotor could be replaced with a turbine having a plurality of blades. However, more blades add to the weight and the inertia of the turbine. This would reduce the responsiveness of the meter to changes in the flow and would also increase the friction in the bearings. For this reason a low-inertia, two-bladed rotor is preferred.

The magnetic flux lines produced by the permanent magnet 14 and passing through the pole piece 17 and bolt 16 will be altered as the blades of the rotor 40 pass the bolt 16. These flux changes will induce voltage pulses in the coil 15 which are detected by appropriate electrical circuitry through connecting wires 43 and 44.

Figure 3:
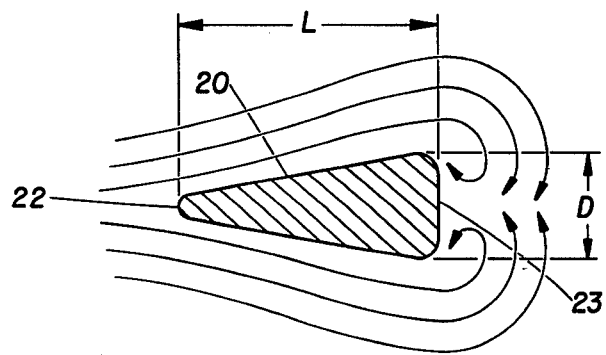
FIG. 3 is a cross sectional view of the upstream strut of the flowmeter viewed along section line 3—3 of FIG. 2.

FIG. 3 shows a cross section of the upstream strut 20. This strut is designed to induce turbulence in the fluid before it flows past the rotor. The important feature of this design is that the downstream face 23 must be non-streamlined such that a low pressure zone is created in the flow behind the strut. The fluid particles will be drawn into this low pressure zone in a direction transverse to the direction of flow as shown in FIG. 3. Thus, the desired turbulence is created making the velocity distribution more uniform throughout the diameter of the fluid passage 50. The preferred shape of the downstream face 23 is substantially flat and perpendicular to the line of direction of fluid flow indicated by the arrows in FIG. 2. The upstream face 22 is shown as being streamlined, but its specific design may vary within reasonable limits without having a measurable effect on the accuracy of the meter.

The upstream strut 20 is also wider than the conventional vane, the preferred width dimension D being about 8 percent of the inside diameter of the fluid passage 50.

The length L of the strut 20 is determined by the strength requirements of the strut. Since the length L need not be very great to supply the strength required, the length of the meter body 10 housing the struts and rotor can be greatly reduced from the dimensions of previous turbine meters. More than one strut could extend from the inner wall of the turbine cartridge 11 to the hub 30. The preferred embodiment is only one upstream strut. Sufficient turbulence is induced by the hub 30 and the strut 20 as shown in order to give the accuracy desired. The distance from the strut 20 to the rotor 40 is not critical as long as the rotor is not placed outside of the turbulent flow zone induced by the strut 20.

The downstream strut 21 serves only to hold the bearing 33 in proper alignment with the center of the turbine cartridge 11.

As can be seen in FIG. 1, the rotor and struts present a minimum number of components in the fluid passage 50, thus allowing the passage of abrasives and foreign objects in the flow with less likelihood of damage to the meter.

Less obstruction in the fluid passage 50 will also result in much less pressure drop through the meter. Thus the meter will have a greater fluid transmitting capacity than previous turbine meters. The design further allows the meter to be clamped between the flanges of pipe sections of a pipeline in which a fluid flows without necessitating flanges or threads of its own for that purpose. This design also allows the meter cartridge to be assembled, adjusted and calibrated at a central facility and then shipped to a remote location and inserted into a meter body to replace a turbine cartridge which may have become damaged or is not operating properly.

In operation, a fluid is directed through the fluid passage 50 in the turbine cartridge 11 which has been inserted into the meter body 10 and positively locked there by the bolt 16. Thus, the cartridge 11 can neither move downstream nor rotate under the forces exerted by the flow. The fluid divides and flows around the upstream face 22 of the upstream strut 20 and then tumbles into the low pressure zone created behind the strut 20 by the blunted, flat downstream face 23. This tumbling or turbulence causes the flow particles to move in a direction transverse to the normal direction of flow and thus causes the velocity distribution to be more uniform in the fluid passage 50. The effect of this turbulence is that the linearity of the meter is increased thus making the meter more accurate over a larger range of flow rates.

The fluid then flows across the two-bladed, magnetic rotor 40 mounted on a carbide shaft 37 which turns in carbide bearings 32 and 33.

As the rotor 40 and shaft 37 turn, the magnetic blades 40a and 40b pass the bolt 16 where they become a part of the magnetic circuit causing a change in the magnetic flux in the pole piece 17. This change induces a voltage pulse in coil 15 which can be sensed through the connecting wires 43 and 44 and recorded by suitable means.

The disclosed invention results in a flowmeter whose accuracy is improved over similar devices by stabilizing the meter factor in the upper 30 percent and lower 20 percent of the flow range. The stabilized meter factor has improved the calibration tolerance from 4 percent for similar devices to less than 1 percent for flowmeters constructed in accordance with this invention over the same flow range.

While what has been disclosed herein is a preferred embodiment of the present invention, it is of course understood that various modifications and changes may be made therein without departing from the scope of the invention. It is therefore intended to cover in the appended claims all such devices as fall within the true spirit and scope of the present invention.

What is claimed is:

1. A method of measuring fluid flow comprising:
   introducing a fluid stream into a tubular passageway;
   passing the fluid stream around a strut fixed within the tubular passageway and having a generally flat downstream face perpendicular to the fluid flow and introducing turbulence into a zone of the fluid stream downstream of said strut;
   passing the turbulent fluid stream into a rotor having two blades of magnetic material located in said turbulence zone for rotation in response to the fluid flow; and
   sensing the rotation of the magnetic rotor blades with a magnetic pick-up element.

2. A fluid flowmeter comprising:
   a meter body having a longitudinal passageway formed therethrough having an upstream end portion and a downstream end portion;
   an upstream strut formed in the upstream end portion of the passageway and extending into the center of the passageway from the wall thereof, said upstream strut including a generally flat downstream face lying in a plane substantially perpendicular to the longitudinal axis of the passageway and dimensioned to cause a zone of turbulence downstream of said upstream strut;
   a downstream strut formed in the downstream end portion of the passageway and extending into the center of the passageway from the wall thereof;
   a shaft having a first end and a second end and journaled in the center of the passageway coaxial therewith with the first end thereof rotatably supported by said upstream strut and with the second end thereof rotatably supported by said downstream strut;
   rotor means having a plurality of magnetic blades carried by said shaft and located in said turbulence zone for rotating in response to the fluid flow through the passageway; and
   magnetic pick-up means carried by said meter body adjacent to the magnetic blades of said rotor means for sensing the rotation of said rotor means.

3. The fluid flowmeter as defined in claim 2 wherein said rotor means is characterized further as having two magnetic blades.

4. The fluid flowmeter as defined in claim 3 wherein the longitudinal passageway through said meter body is cylindrically shaped and the width of the downstream face of said upstream strut is approximately 0.08 times the diameter of the cylindrically shaped longitudinal passageway.

5. A fluid flowmeter comprising:
   a meter body having a cylindrical bore formed therein and a transverse opening formed therein intersecting the cylindrical bore;
   a turbine cartridge having a substantially cylindrically shaped outer surface and slidably received within the cylindrical bore of said meter body, said cartridge having a longitudinal tubular passageway extending therethrough coaxial with the bore, the tubular passageway having an upstream end portion and a downstream end portion and having a transverse opening formed therein intermediate the upstream and downstream end portions communicating between the tubular passageway and the outer surface thereof, said turbine cartridge being positioned within the cylindrical bore with the transverse opening therein in communication with the transverse opening in said meter body;
   an upstream strut formed in the upstream end portion of the tubular passageway through said turbine cartridge and extending into the center of the passageway from the wall thereof, said upstream strut including a generally flat downstream face lying in a plane substantially perpendicular to the longitudinal axis of the tubular passageway and dimensioned to cause a zone of turbulence downstream from said upstream strut;
   a downstream strut formed in the downstream end portion of the tubular passageway and extending into the center of the passageway from the wall thereof;
   a shaft having a first end and a second end and journaled in the center of the tubular passageway coaxial therewith with the first end thereof rotatably supported by said upstream strut and with the second end thereof rotatably supported by said downstream strut;

rotor means having a plurality of magnetic blades carried by said shaft and located in said turbulence zone for rotating in response to fluid flow through the tubular passageway and further located adjacent said communicating transverse openings; and magnetic pick-up means disposed through the transverse opening in said meter body and into the communicating transverse opening in said turbine cartridge for sensing the rotation of said rotor means.

6. The fluid flowmeter as defined in claim 5 wherein said rotor means is characterized further as having two magnetic blades.

7. The fluid flowmeter as defined in claim 6 wherein the tubular passageway through said turbine cartridge is cylindrically shaped and the width of the downstream face of said upstream strut is approximately 0.08 times the diameter of the cylindrically shaped tubular passageway.

* * * * *